(12) United States Patent
Ou et al.

(10) Patent No.: US 6,910,383 B2
(45) Date of Patent: Jun. 28, 2005

(54) ISOLATED MICRO PRESSURE SENSOR AND METHOD FOR MAKING THE SAME

(75) Inventors: Yeong-Jeong Ou, Keelung (TW); TaiKang Shing, Hsinchu (TW); Justin Clark, Salt Lake City, UT (US); Ke-Shieng Yang, Taipei (TW); Jeng-Shie Chung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/325,868

(22) Filed: Dec. 23, 2002

(65) Prior Publication Data
US 2004/0118213 A1 Jun. 24, 2004

(51) Int. Cl.$^7$ ................................. G01L 9/00
(52) U.S. Cl. ....................................... 73/754
(58) Field of Search .................... 73/700, 704, 724, 73/727, 754; 361/283.4; 3612/283.4

(56) References Cited

U.S. PATENT DOCUMENTS 5,305,643 A * 4/1994 Thomas et al. ............... 73/704
6,012,335 A * 1/2000 Bashir et al. ................. 73/724
6,308,575 B1 * 10/2001 Yang et al. ................... 73/727

* cited by examiner

Primary Examiner—Michael CyGan
Assistant Examiner—Andre Allen
(74) Attorney, Agent, or Firm—Bacon & Thomas

(57) ABSTRACT

A micro pressure sensor comprising a glass substrate or a bulk silicon wafer with a rampart protruding from the surface and a plurality of first contacting pads, a thin membrane having a plurality of piezo-resistors, circuit patterns, and a plurality of second contact pads, and conducting lines, wherein the plurality of contact pads are partially exposed to outside. The rampart on the substrate has a cavity formed on the center of the top surface of the rampart. The top surface of the rampart is tightly bonded to the surface of the thin membrane. The piezo-resistors are sealed in the cavity. Preferably, the micro sensor further comprises a plurality of thermo sensors, and a plurality of temperature-controlling elements all enclosed inside the cavity, and additional protective layers formed on the exposure regions of all contact pads.

9 Claims, 5 Drawing Sheets

ISOLATED MICRO PRESSURE SENSOR AND METHOD FOR MAKING THE SAME

BACKGROUND OF THE INVENTION

1. Field of the Invention

The present invention relates to a micro pressure sensor and, more particularly, to an isolated micro pressure sensor suitable to be used in biological field or in erosive environment.

2. Description of Related Art

Many micro pressure sensors such as piezo-resistive micro pressure sensors, electric-capacitive micro pressure sensors, piezoelectric micro pressure sensors, or resonant micro pressure sensors are widely used in industry and our daily life. Among them, the piezo-resistive micro pressure sensors are mostly used in automobile and medical field for their advantages of small volume, low cost, and good performance. In the conventional manufacturing process for the piezo-resistive micro pressure sensors, however, complicated photolithography processes and various photo masks are needed to produce various forms of piezo-resistive micro pressure sensors for meeting the specifications under different operational pressure ranges. This conventional method requires higher cost, and takes longer lead-time to fabricate various forms of sensors.

With reference to FIG. 1, the structure of conventional piezo-resistive micro pressure sensors is shown. The conventional piezo-resistive micro pressure sensor comprises a glass substrate 100 having a ventilation channel 110 and a silicone substrate 120 having a cavity 130, a plurality of piezo-resistors 140 and a diaphragm 150. The piezo-resistors 140 are connected to metal pads 160 through conductive circuits formed on the substrate. When fluid or gas flows into the ventilation channel 110, the pressure will be passed through the cavity 130, and the diaphragm 150 will be forced to deform and to pass the strain to the piezo-resistors 140. The piezo-resistors 140 further transform the strain into electric signals and output the electric signals to gold wire 170 through the metal pads 160.

However, the sensing elements (the piezo-resistors and the conductive circuits) of the conventional piezo-resistive micro pressure sensors as shown in FIG. 1 are exposed to the environment media. Hence, the conventional piezo-resistive micro pressure sensors are not suitable to implement in some corrosive conditions, such as in erosive fluid or in biological environment (e.g. in blood).

U.S. Pat. No. 6,308,575 describes a manufacturing method for the miniaturization of silicon bulk-machined pressure sensors. This patent only provides a micro pressure sensor small enough to implant into human or animal body, but the pressure sensing elements included in such pressure sensors are still exposed to the environment. Therefore, the stability of the micro pressure sensor decreases and not suitable for biomedical use, either.

Therefore, it is desirable to provide a novel isolated micro pressure sensor to mitigate and/or obviate the aforementioned two problems.

SUMMARY OF THE INVENTION

One object of the present invention is to provide a method for manufacturing a micro pressure sensor to reduce the manufacturing cost by decreasing the number of required photo masks, and simplifying the required photolithographic processes.

Another object of the present invention is to provide a micro pressure sensor that can be used in a biological or corrosive environment.

To achieve the objects, the fabrication method of the present invention includes following steps: (a) providing a substrate having a first upper surface at first, and then (b) etching the first upper surface of said substrate to form a plurality of plate portions and a rampart; wherein said rampart is surrounded by plate portions and has a cavity formed on the center of its top surface; (c) forming a plurality of first contact pads on said plate portions outside said rampart; (d) providing a bulk silicon wafer having a second upper face; (e) forming a plurality of piezo-resistors and a plurality of second contact pads on said second upper surface of said bulk silicon wafer; (f) forming circuit patterns on said second upper surface of said bulk silicon wafer to connect said piezo-resistors and said plurality of second contact pads; (g) forming a plurality of grooves on said second upper face of said bulk silicon wafer outside of said piezo-resistors and said plurality of second contact pads; (h) bonding said substrate and said second bulk silicon wafer so that the top surface of said rampart on said substrate faces the upper second face of said bulk silicon wafer, and said plurality of first contact pads contact said plurality second contact pads; and (i) thinning said bulk silicon wafer until said bulk silicon wafer forming a thin membrane which separates itself from the whole wafer and providing partial exposure regions of said plurality of first contact pads.

The present invention also provides a micro pressure sensor, which comprises a substrate having a rampart and a plurality of first contact pads; and a silicon membrane having a second upper surface with a plurality of piezo-resistors, a plurality of second contact pads and circuit patterns connected said piezo-resistors and said plurality of second contact pads; wherein the second upper face of said silicon membrane faces and bonds the top surface of said rampart on said substrate, and therefore seal said cavity on said rampart to form a closed chamber.

The micro pressure sensor mentioned above can further comprises a plurality of thermo sensors and a plurality of temperature-controlling elements on the upper face of said silicon membrane and enclosed inside said sealed chamber to control the pressure detection range by controlling the inner temperature and therefore the inner pressure of said sealed chamber.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
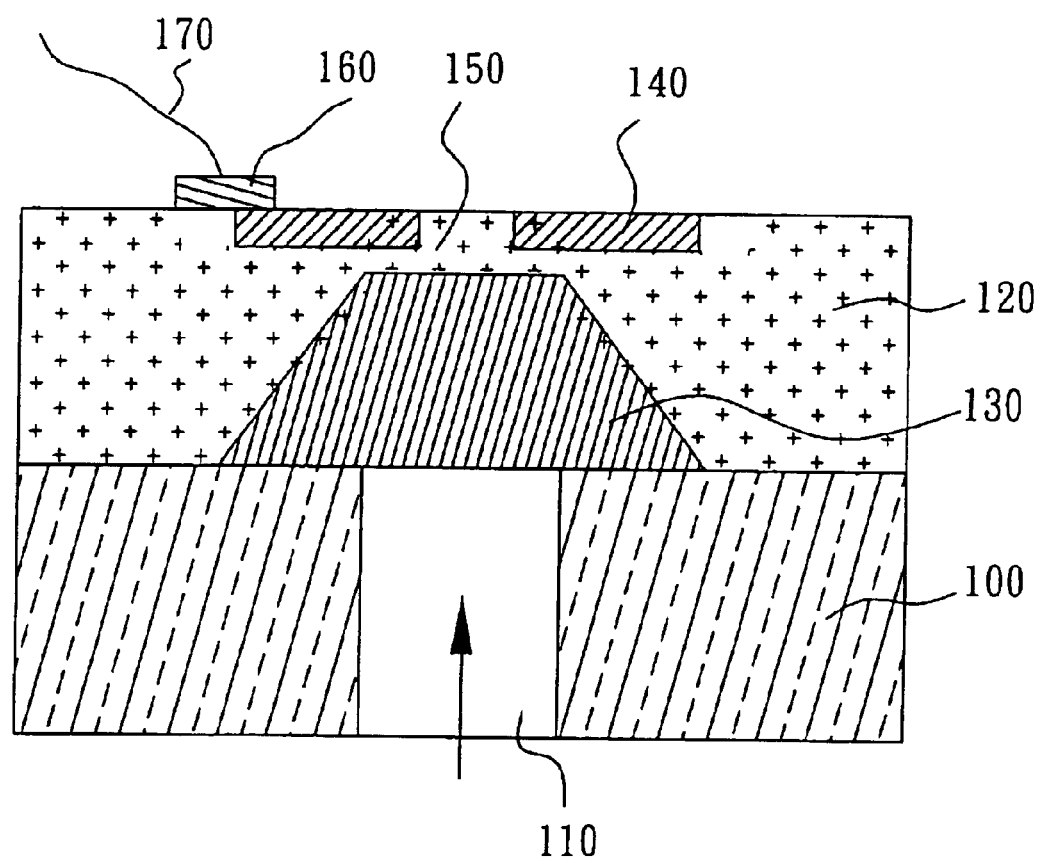
FIG. 1 is a sectional view of the conventional piezo-resistive micro pressure sensor.
Figure 2:
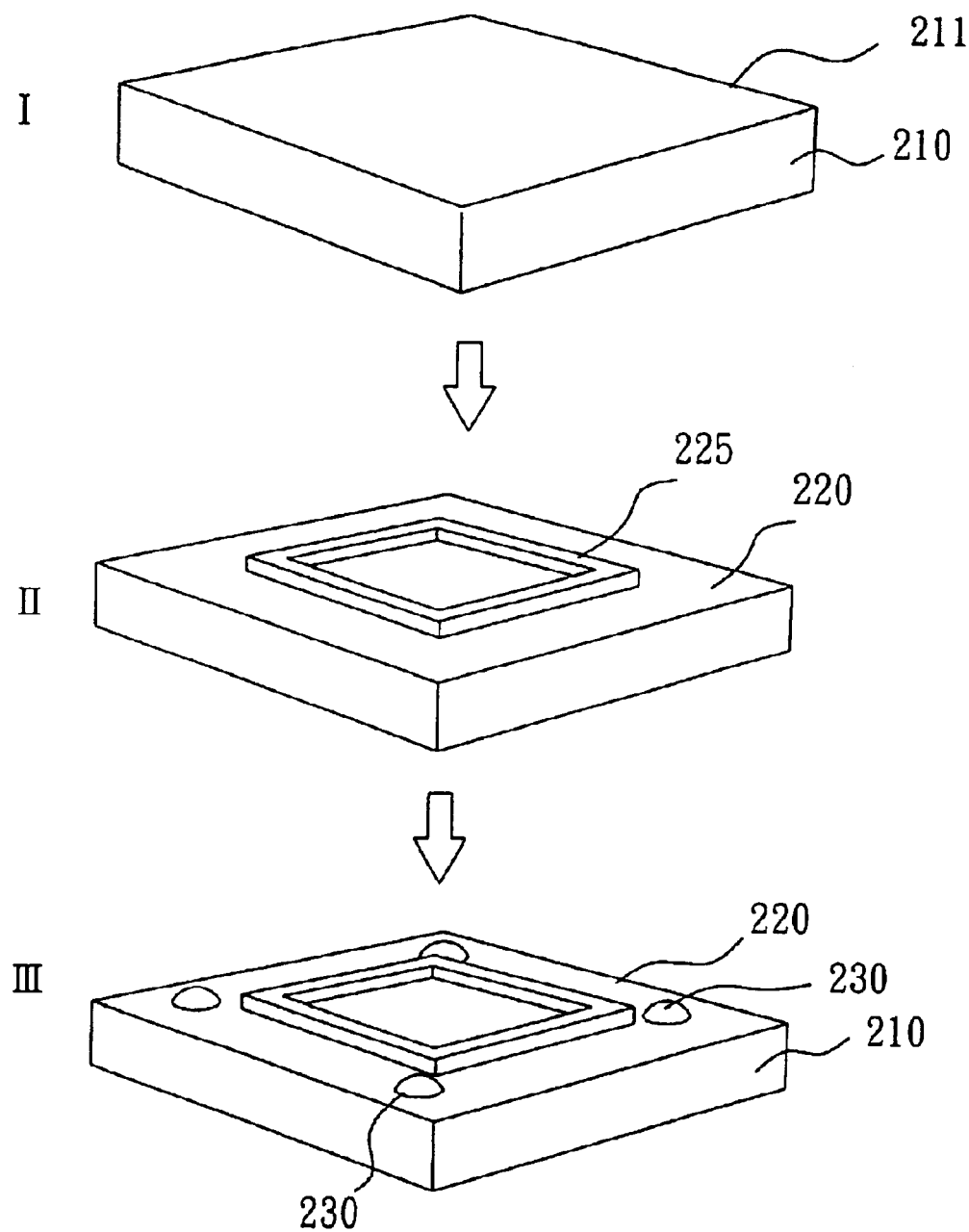
FIG. 2 shows the process for treating the substrate.

With reference to FIG. 2, a process for pre-treating the substrate 210 is shown. As shown in FIG. 2, a substrate 210 with an upper surface 211 is provided at first. The substrate of the present invention can be any conventional materials. Preferably, the substrate is a glass substrate or a bulk silicon wafer.

Then a rampart 225 inside is formed through chemically etching the upper surface 211. The chemical etching can be any conventional chemical etching such as acid etching. It depends on the material of the substrate. Portions of the upper surface 211 are not etched and form the top surface of the rampart 225. The top surface of the rampart could take the shape of any close form such as a square, a rectangular, or a circle with a hole inside to form a cavity inside the rampart. After the completion of the etching process, a new etched upper surface 220 is formed around the rampart 225 on the substrate 210. In the present embodiment, the height of a square rampart protruding from said surface 220 is about several μm, and the size of the square rampart with a square cavity inside is about one mm wide.

Four aluminum contact pads 230 are formed on the surface 220 (outside the rampart) consequentially by metal deposition wherein the heights of contact pads 230 are about one μm.

Figure 3:
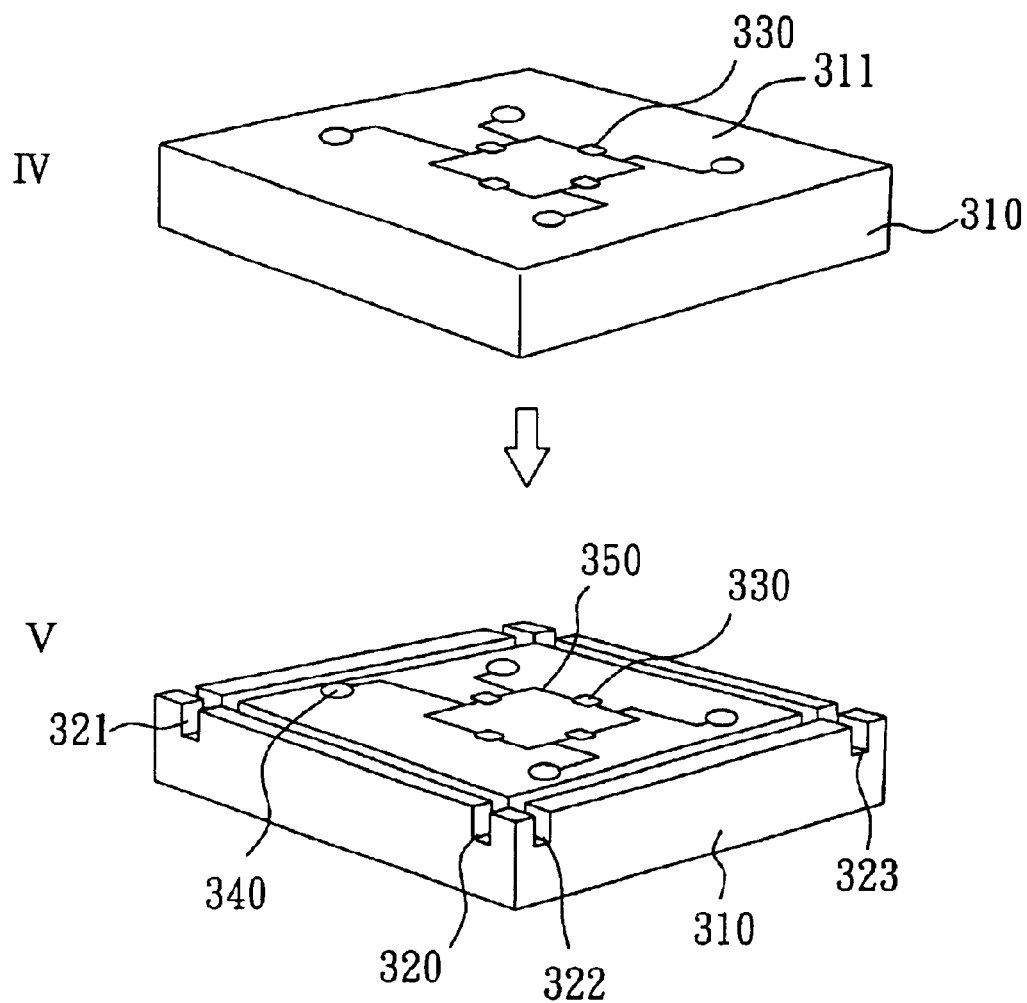
FIG. 3 shows the process for treating the bulk silicon wafer.
Figure 4:
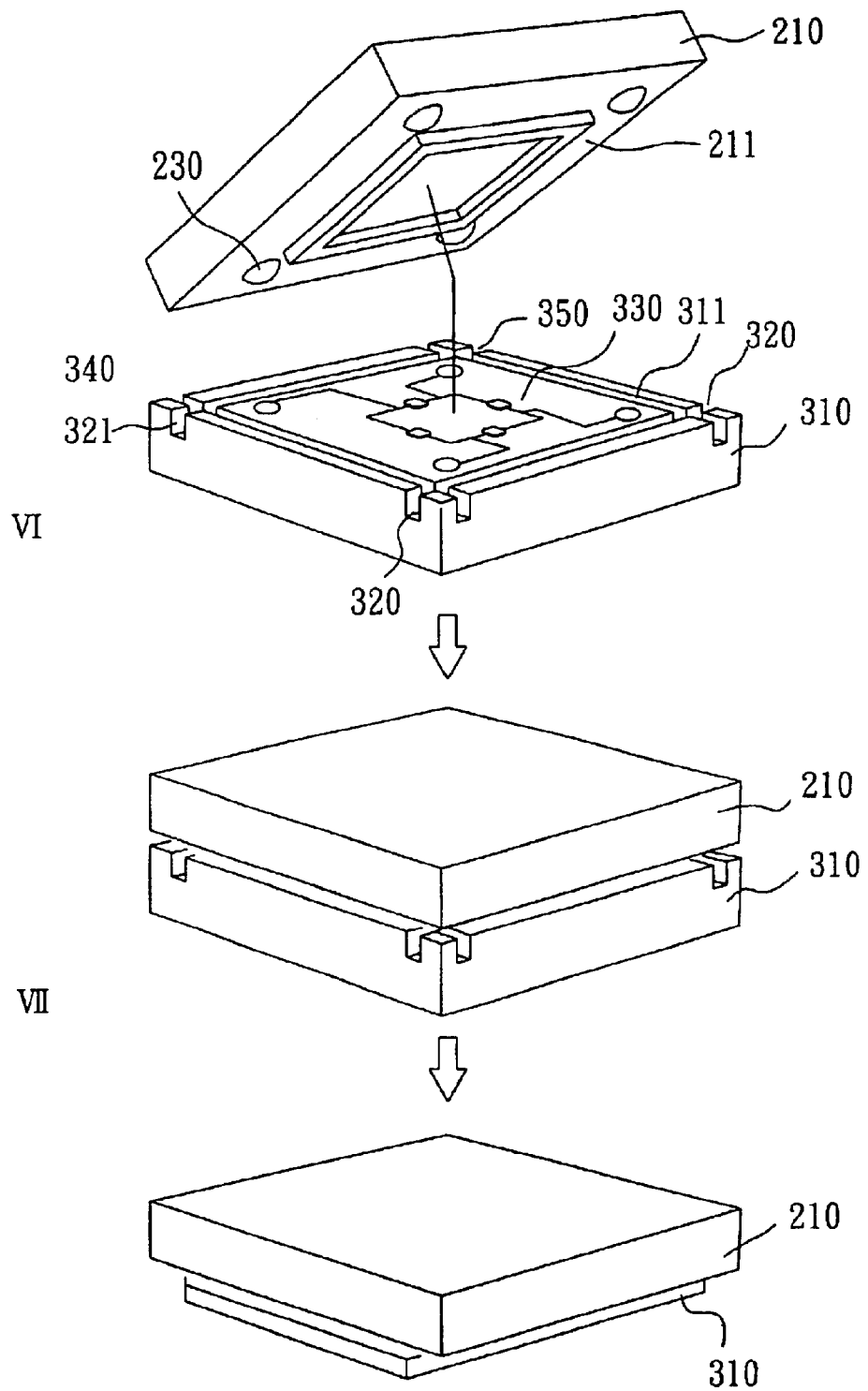
FIG. 4 shows the process of bonding and thinning for manufacturing the micro pressure sensor according to the present invention.

As shown in FIG. 3, a bulk silicon wafer 310 having another upper surface 311 is subsequently provided. Four piezo-resistors 330 are formed on the upper surface 311 of the bulk silicon wafer 310 by, preferably, ion implantation. Preferably, the depths of the four piezo-resistors 330 are about one to two μm. Next, a circuit pattern 350 is formed on the upper surface 311 to properly connect the four piezo-resistors 330 and four contact pads 340 and to construct a Wheatstone bridge configuration. Preferably, the circuit pattern 350 is formed by boron implantation.

Four aluminum contact pads 340 are formed on the surface 311 consequentially by metal deposition wherein the heights of contact pads 340 are about one μm.

Four grooves 320, 321, 322 and 323 are formed on the surface 311. The grooves can be achieved by any conventional method such as chemical etching or cutting. The four grooves 320, 321, 322 and 323 enclose a square area on the surface 311 with the four piezo-resistors 330 and the four contact pads 340 inside. In the present embodiment, the four grooves are formed through cutting with diamond saws. The depths of the grooves are about twenty to thirty μm, and the distance between any two parallel grooves is about two mm.

The manufacturing process of the micro pressure sensor can selectively further comprise forming a plurality of third contact pads on the surface 211 of said substrate 210, and forming a plurality of thermo sensors, a plurality of fourth contact pads, and a circuit pattern which connect said thermo sensors to said plurality of fourth contact pads on the upper surface 311 of said bulk silicon wafer 310.

Furthermore, the manufacturing process of the micro pressure sensor can selectively comprise forming a plurality of fifth contact pads on the surface 211 of said substrate 210, and forming a plurality of temperature-controlling elements, a plurality of sixth contact pads and a circuit pattern which connects said temperature-controlling elements to said plurality of sixth contact pads on the upper surface 311 of said bulk silicon wafer 310.

Both said thermo sensor and said temperature-controlling elements are arranged to form in the area, which will be enclosed inside the cavity of the rampart 225. The function of said thermo sensor is to provide temperature information inside the cavity for the measurement of pressure change in the cavity. And the function of said temperature-controlling elements is used to control the temperature in the cavity to change the pressure in the cavity.

After pre-treating the substrate 210 and the bulk silicon wafer 310, an alignment process can be carried out and followed by a bonding process. The bonding is achieved through anodic bonding. The anodic bonding is executed to integrate the substrate 210 and the silicon wafer 310 so that the upper surface 211 (that is, the top surface of the rampart 225) of said substrate 210 can securely bond and face the upper surface 311 of said bulk silicon wafer 310, and the plurality of first contact pads 230 securely attach to the plurality of second contact pads 340. One alternative of the bonding process is to perform the directly bonding process at low temperature. An isolated cavity inside rampart 225, therefore, is formed with the piezo-resistors 330 being enclosed inside to prevent the sensing elements from touching the environment media directly. The bonding process can be performed in a gas chamber (preferably, the nitrogen) with a preset temperature and pressure so that the pressure inside the isolated cavity is known. In one preferred embodiments, the plurality of first, third, and fifth contact pads mentioned above are formed on the periphery of said substrate 210, and the plurality of second, fourth, and sixth contact pads are formed on the periphery of said bulk silicon wafer 310. And the contact pads are arranged so that the plurality of the first contacts the plurality of the second, the plurality of the third contacts the plurality of the fourth, and the plurality of the fifth contacts the plurality of the sixth.

Furthermore, the thickness of the bulk silicon wafer 310 is reduced down to form a thin membrane 310 by, preferably, mechanical polishing method cooperated with chemical etching method. The thickness of the thin membrane 310 is about ten μm, which is less than the depths of the grooves 320, 321, 322, 323. Therefore, after the thinning process, the membrane 310 will be automatically separated from the whole silicon wafer plate. And the width of the membrane 310 is less than the width of the substrate 210 so that each sensor can be cut out from the whole substrate plate and the plurality of first contact pads 230, the plurality of third contact pads and the plurality of fifth contact pads are partially exposed to outside.

After the bonding and thinning processes, conducting lines 350 are connected to said exposure regions of said plurality of first contact pads 230 on the surface 211 of said substrate 210. The conducting lines 350 are used to output the electric signals. Furthermore, other conducting lines can be selectively connected to said exposure regions of said plurality of the third and the fifth contact pads on surface 211 to output temperature signal and to input power for temperature control.

Figure 5:
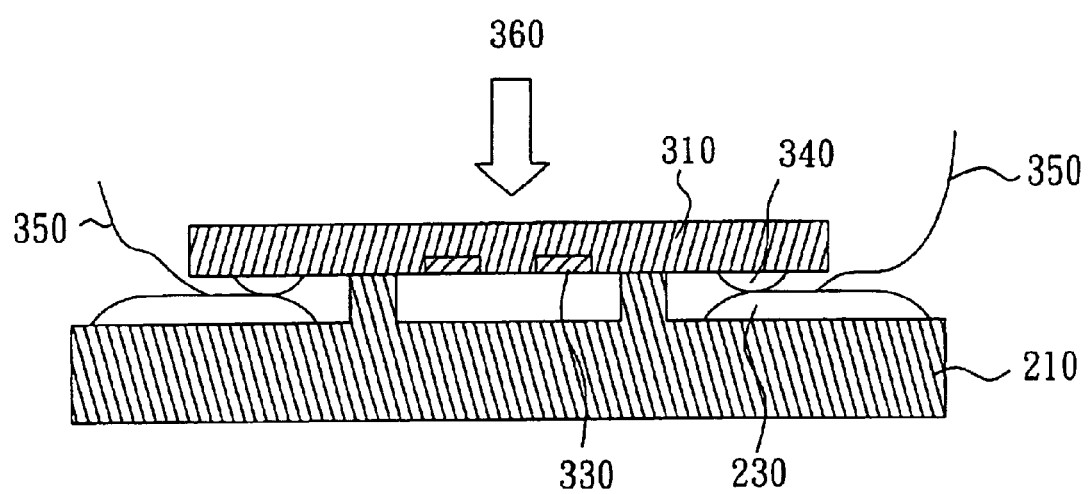
FIG. 5 is a side view of a piezo-resistive micro pressure sensor of the present invention.

The structure of the micro pressure sensor completed through the process of the present invention is shown in FIG. 5. It comprises a glass substrate or a bulk silicon wafer 210 having a rampart protruding from said surface 220 and a plurality of first contacting pads 230, a thin membrane 310 having a plurality of piezo-resistors 330, circuit patterns, and a plurality of second contact pads 340, and conducting lines 350, wherein the plurality of contact pads 230 are partially exposed to outside. Said rampart on said substrate has a cavity formed on the center of the top surface of the rampart. The top surface of the rampart is tightly bonded to the surface of the thin membrane 310. Said piezo-resistors 330 are sealed in said cavity. Preferably, the micro sensor further comprises a plurality of thermo sensors, and a plurality of temperature-controlling elements all enclosed inside said cavity, and additional protective layers formed on the exposure regions of all contact pads.

The fluid or gas pressure is measured by pressing and deforming the silicon membrane 310, and then the piezoresistors 330 on the membrane 310 will produce an electric signal and transmit the signal through said plurality of second contact pads 340. The signal will be then output through said plurality of first contact pads 230 and said conducting lines 350.

From the descriptions aforementioned, the present invention provides a novel isolated micro pressure sensor where the sensing elements are put in an isolated cavity and prevented from exposure to outside environment media. The micro pressure sensor of the present invention can further comprise thermo sensitive elements and temperature-controlling elements, which control the inner temperature and therefore the inner pressure of the isolated cavity of the sensor. Such isolated micro pressure sensors are more stable in biological or erosive environment and are small enough to be implanted into human or animal body. They have the potential for pathological applications, such as measurement of blood pressure or heart pulses for treatment or diagnosis of heart diseases.

The present invention also provides a novel process to produce such isolated micro pressure sensors. The novel method provides a thinning step to control the thickness of the membrane for different pressure detection ranges. This means that we don't need to prepare various sets of photo masks for different ranges of pressure applications. Therefore, less photolithographic processes and less photo masks are needed in the process of the present invention. Also, only one thinning process needed for different ranges of pressure applications. The delivery time could be very short. Hence, the process of the present invention can lower the cost and time for manufacturing.

Although the present invention has been explained in relation to its preferred embodiment, it is to be understood that many other possible modifications and variations can be made without departing from the spirit and scope of the invention as hereinafter claimed.

What is claimed is:

1. A micro pressure sensor, comprising:
   a substrate with a rampart having a first top surface and standing on a plurality of plate portions and a plurality of first contact pads on said plate portions; and
   a silicon membrane having a second upper surface with plurality of piezo-resistors, a plurality of second contact pads and circuit patterns connected said plurality of piezo-resistors and said plurality of second contact pads;
   wherein the second upper face of said silicon membrane faces and bonds the first top surface of said substrate, and said rampart has a cavity forming in the center of the first top surface, and said plurality of contact pads surround said rampart; and
   further comprising a plurality of third contact pads on said plurality of plate portions of said substrate; and a plurality of thermo sensors, a plurality of fourth contact pads and circuit patterns connected said plurality of thermo sensors and said plurality of fourth contact pads on the upper face of said silicon membrane.

2. The micro pressure sensor as claimed in claim 1, wherein the substrate is a glass substrate or a bulk silicon wafer.

3. The micro pressure sensor as claimed in claim 1, wherein said plurality of first contact pads attach said plurality of second contact pads.

4. The micro pressure sensor as claimed in claim 1, further comprising connecting lines connect to the exposed regions of said plurality of first contact pads.

5. The micro pressure sensor as claimed in claim 1, wherein said plurality of third contact pads attach said plurality of fourth contact pads.

6. The micro pressure sensor as claimed in claim 1, further comprising connecting lines connect to the exposed regions of said plurality of third contact pads.

7. The micro pressure sensor as claimed in claim 1, further comprising a plurality of fifth contact pads on said plurality of plate portions of said substrate; and a plurality of temperature-controlling elements, a plurality of sixth contact pads and circuit patterns connected said plurality of temperature-controlling elements and said plurality of sixth contact pads on the upper face of said silicon membrane.

8. The micro pressure sensor as claimed in claim 7, wherein said plurality of fifth contact pads attach said plurality of sixth contact pads.

9. The micro pressure sensor as claimed in claim 7, further comprising connecting lines connect to the exposed regions of said plurality of fifth contact pads.

* * * * *